United States Patent [19]

Takemoto et al.

[11] Patent Number: 5,211,763
[45] Date of Patent: May 18, 1993

[54] SOLDERING FLUX COMPOSITION

[75] Inventors: Masanori Takemoto, Anjo; Tatsushi Onishi, Hyogo; Masami Aihara, Kakogawa, all of Japan

[73] Assignees: Nippondenso Co., Ltd., Kariya; Harima Chemicals, Inc., Kakogawa, both of Japan

[21] Appl. No.: 798,931

[22] Filed: Nov. 29, 1991

[30] Foreign Application Priority Data

Nov. 30, 1990 [JP] Japan .................................. 2-337183

[51] Int. Cl.$^5$ ............................................. B23K 35/34
[52] U.S. Cl. ........................................ 148/23; 148/24; 148/25
[58] Field of Search ..................................... 148/23-25

[56] References Cited

U.S. PATENT DOCUMENTS

| | | | |
|---|---|---|---|
| 2,155,307 | 4/1939 | Hagemann et al. | 148/25 |
| 3,162,551 | 12/1964 | Short | 148/23 |
| 3,171,734 | 3/1965 | Berson | 148/24 |
| 3,697,333 | 10/1972 | Hoeffleur | 148/23 |
| 3,791,027 | 2/1974 | Angelo et al. | 148/23 |
| 4,077,815 | 3/1978 | Schuessler | 148/23 |
| 4,360,392 | 11/1982 | Roberts et al. | 148/23 |
| 4,428,780 | 1/1984 | Shedroff et al. | 148/23 |

FOREIGN PATENT DOCUMENTS

| | | |
|---|---|---|
| 0381468 | 8/1990 | European Pat. Off. . |
| 2143734 | 2/1973 | France . |
| 911415 | 11/1962 | United Kingdom . |

Primary Examiner—Peter D. Rosenberg
Attorney, Agent, or Firm—Cushman, Darby & Cushman

[57] ABSTRACT

A soldering flux composition comprising, as a flux base resin, a modified amine compound obtained by reacting (i) at least one member selected from the group consisting of vinyl group-containing compounds, carboxyl group-containing compounds and epoxy group-containing compounds (ii) with an amine compound having an active hydrogen.

6 Claims, No Drawings

SOLDERING FLUX COMPOSITION

BACKGROUND OF THE INVENTION

1. Field of the Invention

The present invention relates to a soldering flux composition suitable for use in, for example, soldering.

2. Description of the Related Art

In conventional soldering fluxes, freon or the like is used as a cleaning solvent for cleaning away any flux remaining after the soldering, but nowadays the environmental destruction caused by flon has become a serious issue, and a solution to this issue is urgently required.

As one solution, there is considered a method in which freon cleaning is replaced by water cleaning, for the removal of residual flux, and recently, water-soluble fluxes have been investigated.

As the water-soluble flux, an inorganic salt type flux composed of zinc chloride, hydrochloric acid and the like, and an organic salt type flux comprising an amine hydrohalogenide and glycerol, polyethylene glycol or the like are used. These conventional fluxes, however, are defective in that the activity of removing an oxide on the metal surface is too strong, and if the cleaning is not thorough, corrosion occurs. Moreover, when these conventional fluxes are used for solder paste, the viscosity is too low and a good printing cannot be obtained. Accordingly, the development of a novel water-soluble flux is urgently required in the art.

SUMMARY OF THE INVENTION

Therefore, the objects of the present invention are to eliminate the above-mentioned disadvantages of the prior art and to provide a soldering flux composition having a good adaptability to water cleaning (or a good water cleanability) and showing an excellent printability when the flux is applied, for example, to a solder paste.

Other objects and advantages of the present invention will be apparent from the following description.

In accordance with the present invention there is provided a soldering flux composition comprising, as a flux base resin, a modified amine compound obtained by reacting (i) at least one compound selected from the group consisting of vinyl group-containing compounds, carboxyl group-containing compounds and epoxy group-containing compounds with (ii) an amine compound having an active hydrogen.

DESCRIPTION OF THE PREFERRED EMBODIMENT

Examples of the amine compounds having an active hydrogen, usable for the preparation of the modified amine compounds in the present invention, are methylamine, ethylamine, n-propylamine, isobutylamine, n-hexylamine, n-octylamine, nonylamine, 2-ethylhexylamine, decylamine, stearylamine, cyclohexylamine, allylamine, dimethylamine, diethylamine, diisopropylamine, ethylene diamine, trimethylene diamine, hexamethylene diamine, toluene diamine, xylylene diamine, diethylene triamine, triethylene tetramine, tetraethylene pentamine, pentaethylene hexamine, monoethanolamine, diethanolamine, phenylene diamine and diaminodidiphenylmethane.

Examples of the vinyl group-containing compounds usable for the preparation of the modified amine compounds in the present invention are various (meth)acrylic acid esters (e.g., methyl esters, ethyl esters, butyl, 2-ethylhexyl, 2-hydroxyethyl, hydroxypropyl), vinyl chloride, vinyl acetate, vinylpyrrolidone, vinyl toluene, styrene, α-methyl styrene, (meth)acrylonitrile, (meth)acrylamides, maleic acid esters, fumaric acid esters, itaconic acid esters.

Examples of the carboxyl group-containing compounds usable for the preparation of the modified amine compounds in the present invention are acetic acid, benzoic acid, succinic acid, maleic acid, adipic acid, lactic acid, hydroxypivalic acid, dimethylolpropionic acid, citric acid, malic acid, glyceric acid, octylic acid, animal and vegetable fatty acids, oxalic acid, fumaric acid, sebacic acid, dimer acid, $C_{12}$–$C_{28}$ dibasic acid, phthalic acid, isophthalic acid, terephthalic acid, trimellictic acid, pyromellitic acid, quinic acid, glycolic acid, and tartaric acid.

Examples of the epoxy group-containing compounds, usable for the preparation of the modified amine compound in the present invention are methylglycidyl ether, butylglycidyl ether, phenylglycidyl ether, glycidol, polyethylene glycol diglycidyl ether, neopentyl glycol diglycidyl ether, trimethylolpropane triglycidyl ether, glycerol polyglycidyl ether, sorbitol polyglycidyl ether, a bisphenol type epoxy resin, a novolak type epoxy resin, glycidyl versatate, diglycidyl phthalate, styrene oxide, 2-ethylhexyl glycidyl ether, ethylene glycol diglycidyl ether, diglycidyl esters of $C_{12}$–$C_{28}$ dibasic acids, and (poly)propylene glycol diglycidyl ether.

The modified amine compound used in the present invention can be easily synthesized by an addition reaction of the active hydrogen containing amine compound with the vinyl group-containing compound, a condensation reaction of the active hydrogen atom containing amine compound with the carboxyl group-containing compound, or an addition reaction of the active hydrogen containing amine compound with the vinyl group-containing compound, or by a combination of two or more of the foregoing reactions. This modified amine compound has an amine activity. To increase the water cleanability, preferably at least two hydrophilic groups, such as hydroxyl groups, are bonded per molecule of the modified amine compound. Where the flux is used for a solder paste flux, to improve the printability, preferably the modified amine compound is prepared in the form of a viscous material having a molecular weight of at least 200.

The modified amine compound according to the present invention is preferably obtained by reacting (i) at least one compound selected from the group consisting of vinyl group-containing compounds, carboxyl group-containing compounds and epoxy group-containing compounds (ii) with an amine compound having an active hydrogen at an equivalent ratio (i)/(ii) of 0.03 to 1.0, more preferably 0.05 to 0.9. When the equivalent ratio is less than 0.03, the amine is not liable to be satisfactorily modified to result in the insufficient viscosity properties and water cleanability. Conversely, when the equivalent ratio is more than 1.0, the amount of the active hydrogen of the amine compound tend to be insufficient such that the further reaction cannot occur.

The soldering flux composition according to the present invention preferably contains 1% to 80% by weight, more preferably 10 to 60% by weight, based upon the total weight of the flux, of the above-mentioned modified amine compound, as a flux base resin. When the content of the modified amine compound is less than 1% by weight in the soldering flux composition, the viscosity properties and, the water cleanability of the resultant flux composition tends to become poor. Conversely, when the content of the modified amine compound is more than 80% by weight, the preparation of the flux becomes difficult due to the high viscosity thereof.

The soldering flux composition of the present invention may further comprise a known activator. As the activators, there can be used hydrohalogenic acid salts of amines, organic acids, amines. Examples of such activators are hydrohalogenic acid salts of amines such as those of ethylamine, diethylamine, triethylamine and aniline, organic acids such as benzoic acid, succinic acid, maleic acid, adipic acid, lactic acid, hydroxypivalic acid, dimethylolpropionic acid, citric acid, malic acid and glyceric acid, and amines such as diphenylguanidine and triethanolamine. Although there are no specific limitations to the content of the activator in the flux composition, the preferable content is 0.1% to 30% by weight.

Furthermore, as the solvent there can be used at least one compound of alcohol compounds, ester compounds, ether compounds, ketone compounds, hydrocarbon compounds Examples of such solvents are alcohols such as isopropyl alcohol and butylcarbitol, esters such as ethyl acetate, hydrocarbons such as toluene, and ketones such as methylethyl ketone. Although there are no specific limitations to the content of the solvent in the flux composition, the preferable content is 5% to 98% by weight. Other additives customarily used also can be used in the present invention.

According to the present invention, since a modified amine compound, which is easily rendered water-soluble and retains a good water solubility even after heating at the soldering step, is used as the base resin, the water cleanability of the flux also can be improved.

Furthermore, since the molecular weight of the modified amine compound can be easily increased, the viscosity can be increased. Accordingly, even if the flux of the present invention is applied, for example, to a solder paste flux, a good printability can be obtained because a sufficient viscosity is attained.

When the flux of the present invention is practically applied, an excellent water cleanability is obtained, and even when the flux is applied to a solder paste, soldering with an excellent printability becomes possible.

EXAMPLES

The present invention is described in more detail with reference to the following Examples, but the present invention is not limited to these Examples.

EXAMPLE 1

A one liter 4-neck flask equipped with a water-draining tube was charged with 215 g of triethylenetetramine as the active hydrogen containing amine compound, and the temperature was elevated to 100° C. in a nitrogen atmosphere by heating with stirring. Then, 198 g of dimethylolpropionic acid and 87 g of succinic acid as the carboxyl group-containing compound were dividedly charged therein while observing the generation of heat. The temperature was elevated to 220° C. and maintained at this level by heating, while removing water formed by the reaction. As the acid value was reduced to 1 or less after 3 hours, the reaction was stopped, and the reaction mixture was cooled and diluted with 298 g of butylcarbitol, whereby a modified amine solution having a solid content of 60% was obtained as a viscous flux base resin.

A 4-neck flask was charged with 55 g of the obtained modified amine solution, 10 g of dimethylolpropionic acid, 15 g of a nonionic surface active agent (S-40 supplied by Nippon Fatty Acid K.K.) and 20 g of butylcarbitol, and they were dissolved by heating with stirring at 140° C. to form a flux of Example 1.

Then, a solder powder of 63Sn-37Pb having a particle size of 45 to 63 μm mixed with stirring with 10.0% by weight of the obtained flux to obtain a solder paste. The obtained solder paste was subjected to the following tests.

At the printability test, the solder paste of Example 1 was continuously printed through a metal mask, having a thickness of 0.2 mm, on fifty glass-epoxy print wired board (i.e., PWB) (having a size of 150 mm × 160 mm × 1.5 mm), and the rolling property and printing failures were checked.

The presence or absence of solder ball was checked in the following manner. The solder paste of Example 1 was printed through a metal mask, having a thickness of 0.2 mm, on QFP having a pitch of 0.8 mm, and after reflowing (after IR reflowing was conducted at 150° to 160° C. for 60 seconds, reflowing was carried out at 200° to 230° C. for 30 seconds), the number of solder ball in 10 pads was examined.

At the water cleanability test, PWB soldered with the solder paste of Example 1 was immersed in distilled water warmed to 60° C. for 60 seconds, and then immersed in water at room temperature for 30 seconds to effect cleaning. The state of the cleaned PWB was visually examined through a microscope.

At the insulation resistance test, the solder paste of Example 1 was coated on a comb pattern type 2 PWB from JIS C. 6480, and after the above-mentioned reflowing, the PWB was cleaned with water to obtain a test piece. Then, a voltage of 20 V was applied to the test piece for 100 hours in an atmosphere maintained at a temperature of 40° C. and a relative humidity of 95%, and thereafter, a voltage of 100 V was applied in the same atmosphere, and the insulation resistance was measured.

The results of the foregoing tests are shown in Table 1.

EXAMPLE 2

A one liter 4-neck flask was charged with 333 g of butylcarbitol as the solvent, 181 g of triethylenetetramine as the active hydrogen containing amine compound and 0.5 g of hydroquinone, and the temperature was elevated to 100° C. in an air atmosphere by heating with stirring At a temperature maintained at 100° to 120° C., 144 g of hydroxyethyl acrylate as the vinyl group-containing compound was dropped over a period of 1 hour while observing the generation of heat. Subsequently, 176 g of acrylamide as the vinyl group-containing compound was dividedly added therein over a period of 1 hour. The temperature was maintained at the same level for 5 hours, to complete the reaction and the reaction mixture then cooled to obtain a viscous modified amine solution having a solid content of 60% as the flux base resin.

Then, the 4-neck flask was charged with 55 g of the obtained modified amine solution, 10 g of dimethylolpropionic acid, 15 g of S-40 and 20 g of butylcarbitol, and they were dissolved at 140° C. by heating with stirring to form a flux of Example 2.

The flux of Example 2 was formed into a solder paste of Example 2 in the same manner as described in Example 1. The solderability of this solder paste was tested in the same manner as described in Example 1. The results obtained are shown in Table 1.

EXAMPLE 3

A one liter 4-neck flask was charged with 333 g of butylcarbitol as the solvent and 198 g of triethylenetetramine as the active hydrogen containing amine compound, and the temperature was elevated to 100° C. in a nitrogen atmosphere by heating with stirring. At a temperature maintained at 100° to 120° C., 302 g of glycidol as the epoxy group-containing compound was added dropwise over a period of 2 hours while observing the generation of heat. The same temperature was maintained for 2 hours to complete the reaction, and the reaction mixture then cooled to obtain a viscous modified resin solution having a solid content of 60% as the flux base resin.

A 4-neck flask was charged with 60 g of the obtained modified amine solution, 10 g of dimethylpropionic acid, 15 g of S-40 and 15 g of butylcarbitol, and they were dissolved at 140° C. by heating with stirring to form a flux of Example 3.

The flux of Example 3 was formed into a solder paste of Example 3 in the same manner as described in Example 1. The soldering properties of this solder paste were tested in the same manner as described in Example 1. The results obtained are shown in Table 1.

EXAMPLE 4

A one liter 4-neck flask was charged with 333 g of butylcarbitol as the solvent, and as the active hydrogen containing amine compounds, 34 g of monoethanolamine and 118 g of diethanolamine. The temperature was elevated to 100° C. in a nitrogen atmosphere by heating with stirring. At a temperature maintained at 100° to 120° C., 348 g of glycerol diglycidyl ether as the epoxy group-containing compound was added dropwise over a period of 2 hours while observing the generation of heat. The temperature was maintained at the same level for 3 hours to complete the reaction, and the reaction mixture then cooled to obtain a viscous modified amine solution having a solid content of 60% as the flux base resin.

The 4-neck flask was charged with 55 g of the obtained amine solution, 10 g of dimethylolpropionic acid, 15 g of S-40 and 20 g of butylcarbitol, and they were dissolved at 140° C. by heating with stirring to obtain a flux of Example 4.

The flux of Example 4 was formed into a solder paste of Example 4 in the same manner as described in Example 1, and the soldering properties of the solder paste were tested in the same manner as described in Example 1. The results obtained are shown in Table 1.

COMPARATIVE EXAMPLE 1

Instead of the modified amine, triethylenetetramine used as the starting material of the modified amine was used. More specifically, a 4-neck flask was charged with 75 g of triethylenetetramine, 10 g of dimethylolpropionic acid and 15 g of S-40, and they were dissolved at 140° C. by heating with stirring to prepare a flux of Comparative Example 1.

The flux of Comparative Example 1 was formed into a solder paste of Comparative Example 1 in the same manner as described in Example 1. The soldering properties of the solder paste were tested in the same manner as described in Example 1. The results obtained are shown in Table 1.

COMPARATIVE EXAMPLE 2

Instead of the modified amine, polyethylene glycol #600 was used. More specifically, a 4-neck flask was charged with 75 g of polyethylene glycol #600, 10 g of dimethylolpropionic acid and 15 g of S-40, and they were dissolved at 140° C. by heating with stirring to prepare a flux of Comparative Example 2.

The flux of Comparative Example 2 was formed into a solder paste of Comparative Example 2 in the same manner as described in Example 1. The soldering properties of the solder paste were tested in the same manner as described in Example 1. The results obtained are shown in Table 1.

TABLE 1

| | Example No. | | | | Comparative Example No. | |
|---|---|---|---|---|---|---|
| | 1 | 2 | 3 | 4 | 1 | 2 |
| Printability | good | good | good | good | poor | poor |
| Number of Solder Ball | smaller than 1 | smaller than 1 | smaller than 1 | smaller than 1 | 10 | 20 |
| Water Cleanability Appearance | no residue | no residue | no residue | no residue | brown residue | brown residue |
| Insulation Resistance $\Omega$ at 40° C. and 95% | | | | | | |
| Initial stage | $2 \times 10^{11}$ | $3 \times 10^{11}$ | $2 \times 10^{11}$ | $3 \times 10^{11}$ | $2 \times 10^{11}$ | $1 \times 10^{11}$ |
| After 100 hours | $3 \times 10^{10}$ | $4 \times 10^{10}$ | $4 \times 10^{10}$ | $3 \times 10^{10}$ | $5 \times 10^{7}$ | $2 \times 10^{7}$ |

As apparent from the foregoing description, if the modified amine compound of the present invention is used as a base resin of a flux, a good printability and a good cleanability are attained, and even without using freon or the like, which are causes of environmental destruction, soldering can be performed with a good reliability.

In the foregoing examples, solder paste were prepared from flux base resins of the present invention, but the base resin of the present invention can be applied to solders other than a solder paste. For example, the basic resin can be used for a post flux of flow soldering.

In the flux of the present invention, by adjusting the composition of the modified amine compound, cleaning agent other than water can be used.

We claim:

1. A soldering flux composition comprising:
    as a flux base resin, a modified amine compound obtained by reacting (i) at least one compound selected from the group consisting of vinyl group-containing compounds, carboxyl group-containing compounds and epoxy group-containing compounds (ii) with an amine compound having at least one hydrogen atom.

2. A soldering flux composition as claimed in claim 1, wherein a modified amine compound obtained by reacting (i) at least one compound selected from the group consisting of vinyl group-containing compounds, carboxyl group-containing compounds and epoxy group-containing compounds (ii) with an amine compound having an active hydrogen, at an equivalent ratio (i)/(ii) of 0.03 to 1.0 is used as the flux base resin.

3. A soldering flux composition as claimed in claim 1, wherein the content of the flux base resin in the flux composition is 1% to 80% by weight.

4. A soldering flux composition comprising, as a flux base resin, 1% to 80% by weight, based upon the total weight of the flux composition a modified amine compound obtained by reacting (i) at least one compound selected from the group consisting of vinyl group-containing compounds, carboxyl group-containing compounds and epoxy group-containing compounds (ii) with an amine compound having an active hydrogen at an equivalent ratio (i)/(ii) of 0.03 to 1.0.

5. A soldering flux composition comprising:
  (A) a modified amine compound obtained by reacting (i) at least one member selected from the group consisting of vinyl group-containing compounds, carboxyl group-containing compounds and epoxy group-containing compounds (ii) with an amine compound having an active hydrogen, as a flux base resin; and
  (B) an activator.

6. A soldering flux composition as claimed in claim 5, wherein said flux base resin contains 1 to 80% by weight of said modified amine compound therein.

* * * * *